UNITED STATES PATENT OFFICE.

JOHN H. CHEEVER, OF NEW YORK, N. Y.

PROCESS OF VULCANIZING RUBBER HOSE.

SPECIFICATION forming part of Reissued Letters Patent No. 9,210, dated May 25, 1880.

Original No. 123,454, dated February 6, 1872. Application for reissue filed April 22, 1880.

*To all whom it may concern:*

Be it known that I, JOHN H. CHEEVER, of the city, county, and State of New York, have invented a new Improvement in Vulcanizing Rubber Hose, of which the following is a specification.

The object of this invention is to vulcanize the rubber or other gum more thoroughly, efficiently, and quickly than heretofore without liability to overvulcanizing—that is, decomposing or burning—the same, and to produce a perfect hose, both in external appearance and in texture, so that while the hose shall be equally vulcanized throughout it shall also have a smooth and perfectly cylindrical external coating and internal lining, and therefore afford a more perfect and merchantable commodity than has hitherto been known.

Of the vulcanizing or curing processes heretofore in use, as well as of the methods of making or forming the hose, it is unnecessary here to give any special description, they being familiar to those acquainted with the manufacture of vulcanized-rubber goods.

Rubber hose, as is well known, is composed, in part, of canvas or cloth, threads, warps, yarn, or other fibrous or textile material, and in part of india-rubber or other vulcanized gum, which latter acts as a cement both for uniting the several folds of canvas or threads to form them into a cylindrical body, and for rendering the hose impermeable to water, steam, or other fluid.

The present invention concerns only the vulcanizing or curing operation, in accomplishing which the processes and methods known and used prior to this invention are very deficient. Hose vulcanized in accordance with such methods is liable to be imperfectly vulcanized; or if thorough vulcanization is sought to be obtained, and if, therefore, they are allowed to remain in the heater for a longer period of time than is generally deemed necessary, there is liability of overvulcanizing—that is, decomposing or burning—the rubber, and consequently weakening the hose, which is thereby caused to become leaky. The expense and labor and the uncertainty of obtaining a perfect article are, however, the principal difficulties attending this manufacture.

My said invention may be stated, in general terms, to consist in vulcanizing or heating the formed hose in a tube or cylindrical envelope, the hose being expanded to be molded, as it were, within and against the interior of the tube by means of an expanding agent, such as steam applied within the hose.

It also consists in the use, in connection with the internal expanding agent, of an exterior envelope or mold provided with a jacket for receiving steam or other heating agent, so that the heat for vulcanizing the article from the exterior can be readily and effectively applied, and the vulcanization be thoroughly and quickly effected.

The maintaining of the pressure of the steam or expanding agent within the tube or envelope during the vulcanizing operation, or until vulcanization shall have been accomplished, also forms a part of the invention.

To enable others to make and use my said invention, and to understand the manner in which the same is or may be carried into effect, I shall now proceed to describe several modes employed by me to vulcanize hose of various kinds.

First. To line seamless or woven hose I introduce into the interior of the hose, in any known manner, a lining of india-rubber or other vulcanizable gum or compound in the green state, or partly vulcanizable and partly non-vulcanizable, as described in Letters Patent granted to James B. Forsyth and myself June 3, 1868, numbered 79,220. This hose, with its lining, I then place in a metallic tube or cylindrical envelope of such internal diameter that the hose will fit it snugly, which metallic tube is then run into a heater of ordinary or suitable construction. The tube should be about the length of the heater—say fifty feet long—and should be connected at one end with a steam-pipe and provided at the other with a blow-off pipe having a stop-cock. After the tube is run into the heater steam should be let on, which will enter the interior of the hose and force the vulcanizable lining against the interior surface of the fabric, thus causing the union of the two and the vulcanization of the lining. The steam-pressure also forces the outer surface of the hose against the surrounding metallic tube or envelope, thus giving a very complete finish to the exterior of the hose, and preventing it from bulging in spots or expanding unequally and from becoming crooked—defects which are frequently found in hose of this kind made without the employment of an external metallic envelope. The steam being kept on during the operation maintains the proper degree of pressure within the hose. Fresh steam is thus supplied to take the place of any condensed or escaped steam.

When the vulcanization is complete steam is shut off, and what remains in the hose, whether still in the form of steam or condensed into water, can escape at the other end through the cock, which is opened for the purpose. In lieu of steam it will be of course understood that hot air or other suitable expanding agent may be employed.

In order to make seamless hose both coated and lined with vulcanized rubber I take the fabric base of the hose and apply to its exterior and interior a coating and a lining of properly-prepared rubber in the green state by any of the known methods. I then place the hose thus prepared in the metallic tube, which is run into the heater until the vulcanizing operation is completed, steam or other expanding agent being introduced into the interior of the hose, and there allowed to remain until the close of the operation, in order to force the lining out into close contact with the interior walls of the hose.

Second. The same process is applicable to the manufacture of hose made up in the usual manner—that is, by wrapping around a mandrel—rubber in the green state being interposed between its folds. Hose of this kind can be lined, or both lined and coated, with a sheet of green rubber or other vulcanizable substance in the ordinary way. It is then introduced into the metallic tube or envelope, the latter is placed in the heater, and the steam let on, as before. The heater heats the tube and inclosed hose from the outside, and the steam acts on the hose from the inside, so that in this manner a perfectly molded and vulcanized hose with a highly-finished exterior, and either lined or both lined and coated with rubber, is produced.

Third. The same process is also applicable to the manufacture of hose made by threads, warps, yarns, or fabric wound spirally on a mandrel; and, indeed, my method is here highly necessary, as it would be dangerous and productive of injury to hose of this kind to introduce into it steam at any considerable pressure unless the hose were contained in the external metallic tube or envelope.

From the above the manner in which my process may be applied to the manufacture of other kinds of hose will be obvious to those skilled in the art to which this invention relates.

The heat to vulcanize the hose from the exterior, as above described, is supplied by a heater of ordinary or suitable construction; but for this purpose the metallic tube, envelope, or mold may be provided with a jacket for the reception of steam or other heating agent, and that with considerable advantage. With a jacket the required temperature can be obtained with greater promptness and certainty, so that the vulcanization is effected in less time. The several operations are performed in the manner already stated.

The metallic tube or envelope may be of any suitable length and dimensions. A length of about fifty feet is well adapted for the use for which it is designed. It should be well finished internally, so as to impart the proper finish to the exterior of the hose, and if made in sections they should be snugly and accurately fitted together, so as not to form any seam or ridge on the surface of the hose. If, however, a seam in any instance should be formed, it may be cut off by running a properly-gaged knife along the surface of the hose. The tube may also be divided longitudinally into two halves hinged together, so as to open and close to permit the easy introduction and withdrawal of the hose. In short, its form and construction may be varied in many ways which I do not deem it necessary to further particularize, it being manifest that the important point is, that it be made of metal or other suitable material with sufficient strength and resistant capacity to support the inclosed hose against the pressure of the steam within it during the vulcanizing operation, or while the steam is let on, thereby preventing the hose from becoming misshapen, and imparting a very perfect finish to its exterior. Therefore,

What I claim as my invention, and desire to secure by Letters Patent, is—

1. The employment, in the process of vulcanizing hose, of steam or other expanding agent introduced within the hose, in conjunction with an external metallic tube or envelope, which incloses the hose and retains therein the steam or other expanding agent during the vulcanizing operation, substantially as set forth.

2. The process of vulcanization by the use of jacketed envelopes or molds, in combination with means, substantially as described, for producing internal pressure.

3. In the process of vulcanization by the employment of an internal expanding agent, in conjunction with an external metallic envelope, maintaining the pressure of said agent during the vulcanizing operation, substantially as described.

In testimony whereof I have signed this specification in the presence of two subscribing witnesses.

JOHN H. CHEEVER.

Witnesses:

GEO. ARMS,

LAWRENCE A. SNEDEN.